(12) United States Patent
Pettiross et al.

(10) Patent No.: US 7,701,449 B2
(45) Date of Patent: *Apr. 20, 2010

(54) INK CORRECTION PAD

(75) Inventors: Jeffrey W. Pettiross, Seattle, WA (US); Shawna J. Davis, Seattle, WA (US); Leroy B. Keely, Portola Valley, CA (US); Adrian Garside, Sammamish, WA (US); Tobiasz A. Zielinski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1220 days.

This patent is subject to a terminal disclaimer.

(21) Appl. No.: 11/227,068

(22) Filed: Sep. 16, 2005

(65) Prior Publication Data

US 2006/0007190 A1  Jan. 12, 2006

Related U.S. Application Data

(63) Continuation of application No. 10/704,126, filed on Nov. 10, 2003, now Pat. No. 6,989,822.

(51) Int. Cl.
G09G 5/00 (2006.01)

(52) U.S. Cl. ...................... 345/179; 345/156

(58) Field of Classification Search ... 178/18.01–18.07; 345/156–173; 715/533, 532, 541, 863, 864
See application file for complete search history.

(56) References Cited

U.S. PATENT DOCUMENTS

| 5,666,139 | A | | 9/1997 | Thielens et al. |
| 5,682,439 | A | * | 10/1997 | Beernink et al. ............ 382/187 |
| 5,710,831 | A | * | 1/1998 | Beernink et al. ............ 382/189 |
| 5,710,832 | A | | 1/1998 | Berman et al. |
| 5,778,404 | A | * | 7/1998 | Capps et al. ................ 715/234 |
| 6,340,967 | B1 | | 1/2000 | Maxted |
| 6,418,239 | B1 | * | 7/2002 | Hullender et al. ........... 382/229 |
| 6,661,409 | B2 | * | 12/2003 | Demartines et al. ......... 345/173 |
| 6,791,537 | B1 | | 9/2004 | Shim et al. |
| 7,098,896 | B2 | * | 8/2006 | Kushler et al. .............. 345/168 |
| 2003/0212961 | A1 | | 11/2003 | Soin et al. |
| 2004/0070573 | A1 | | 4/2004 | Graham |

* cited by examiner

*Primary Examiner*—Nitin Patel
(74) *Attorney, Agent, or Firm*—Shook, Hardy & Bacon, LLP

(57) ABSTRACT

User interfaces for editing text in pen-based computing systems include: (a) a display portion that displays text; and (b) a correction interface that displays an editable text portion corresponding to at least a portion of the text. The correction interface accepts input via a stylus to enable changes to the editable text portion on a character-by-character basis (e.g., to add, delete, or change individual characters). The correction interface further may include or associate with a "suggestion list" portion that includes alternative(s) to substitute into the editable text portion and/or a "task list" portion that displays potential actions available through the interface. The invention also relates to systems, methods, and computer-readable media to activate, provide, and operate such interfaces.

20 Claims, 14 Drawing Sheets

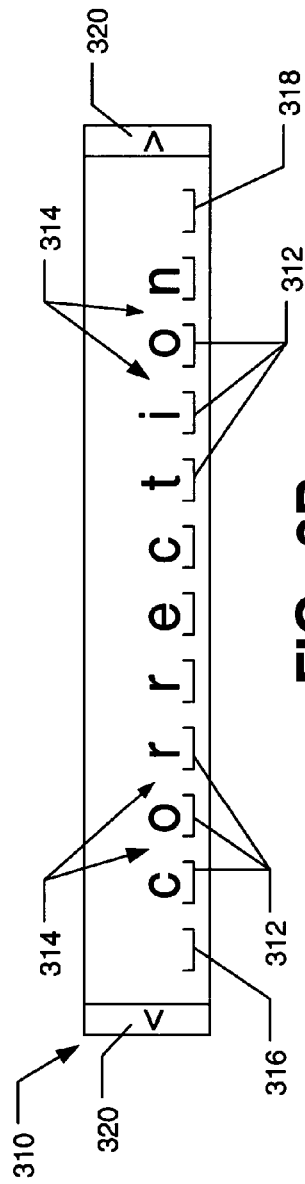
FIG. 3A
FIG. 3B
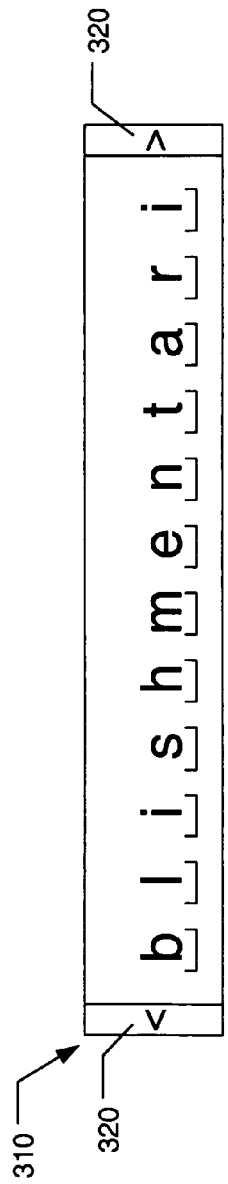
FIG. 5

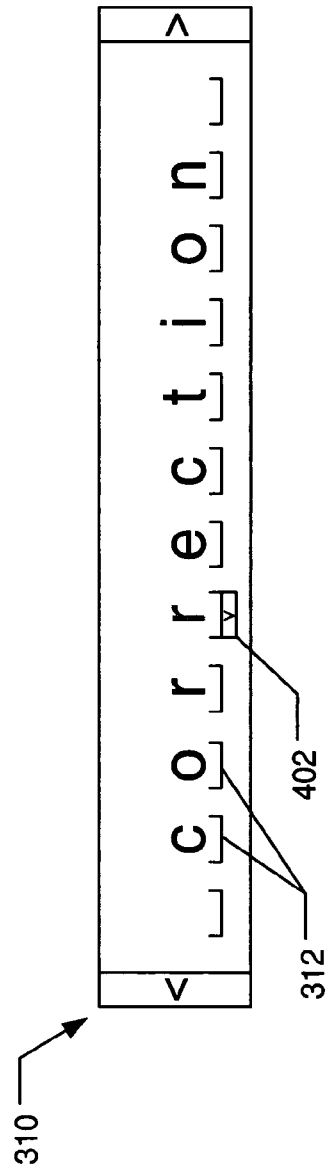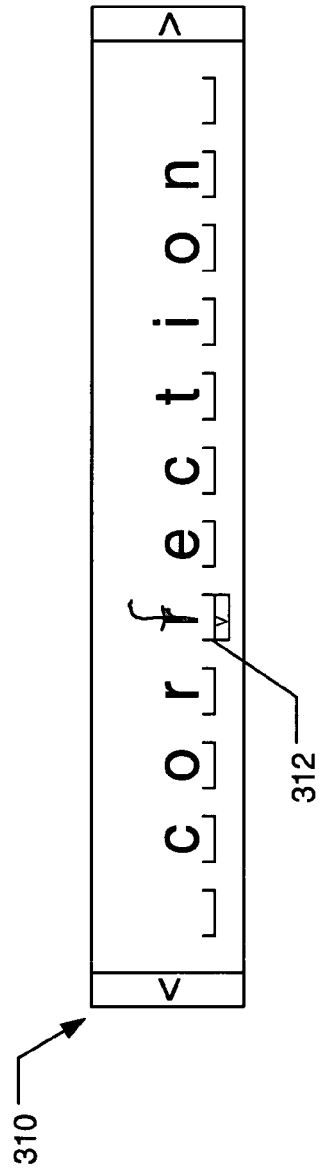
FIG. 4A
FIG. 4B

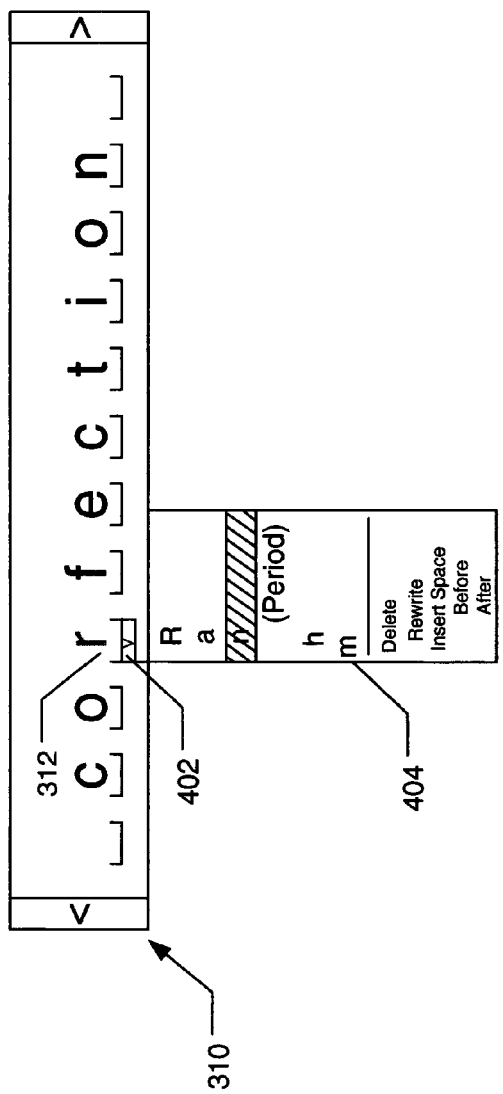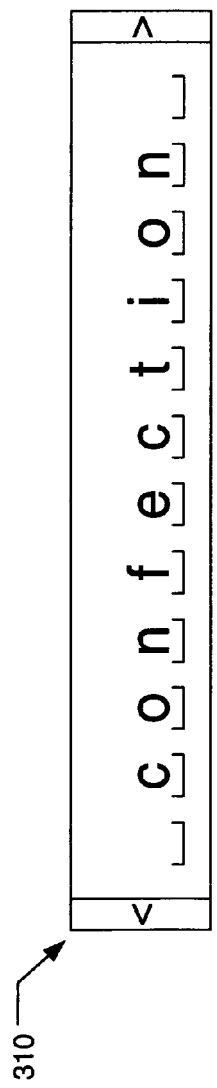
FIG. 4C
FIG. 4D

INK CORRECTION PAD

RELATED APPLICATION DATA

This application is a continuation of U.S. patent application Ser. No. 10/704,126 filed Nov. 10, 2003 (now allowed). This priority application is entirely incorporated herein by reference.

FIELD OF THE INVENTION

The present invention generally relates to user interfaces for interacting with electronic text. Some more specific aspects of the present invention relate to user interfaces, systems, methods, and computer-readable media with computer-executable instructions stored thereon for accepting and/or processing pen or stylus input in pen-based computing systems and/or other computing systems for modifying or editing electronic text.

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, web pages, and the like.

Recently, however, pen-based computing systems, such as tablet PCs and the like, have been increasing in popularity. In pen-based computing systems, user input advantageously may be introduced using an electronic "pen" or stylus (e.g., akin to writing with a pen or pencil on a piece of paper). Indeed, in at least some pen-based computing systems, all user input is capable of being entered and manipulated using an electronic pen input device, and the user interface is fully controllable using only the electronic pen.

As pen-based computing systems are becoming more popular, users are increasingly entering more data in the form of electronic ink. In many instances, users may wish to convert the original electronic ink data to machine-generated text, i.e., text suitable for use and manipulation by conventional word processing programs and other application programs. While handwriting recognition technology for converting handwritten electronic ink text to machine-generated text has improved in recent years, recognizers of this type still are quite error prone, particularly for users with poor handwriting, users that write at an angle, and/or users that write very quickly. Accordingly, much machine-generated text produced by a recognizer still needs to be corrected and/or otherwise changed or edited by the user.

Additionally, one major advantage of computing systems and their associated networks lies in the ability for multiple users to access, review, edit, and otherwise make changes to or comment on electronic documents. Accordingly, pen-based computing system users also have a need to access, review, edit, change, or add text in electronic files and documents from many different sources using their pen-based computing system and the associated electronic pens. Not all of these electronic files and documents originate from electronic ink data and/or from handwriting recognition programs or engines.

At least some existing user interfaces for editing, changing, and/or correcting machine-generated text using only an electronic pen and a pen-based computing system can be awkward, cumbersome, and difficult to use. Also, in many application programs or document types, the electronic document itself cannot be changed or edited using only an electronic pen. These difficulties in using an electronic pen to correct or edit machine-generated text and documents on a pen-based computing system can lead to user frustration, and it can hamper use and adoption of the pen-based computing system. Accordingly, there is a need in the art for improved correction interfaces that allow users to quickly, easily, and efficiently access, review, edit, and change machine-generated text using electronic ink and/or an electronic pen associated with a pen-based computing system.

SUMMARY

Aspects of the present invention relate to user interfaces for interacting with electronic text and to systems and methods for using pen or stylus input in a pen-based computing system for modifying electronic text. Such user interfaces may include: (a) a display portion that displays an original text (e.g., a machine-generated text); and (b) a correction interface that displays an editable text portion corresponding to at least a portion of the original text, wherein the correction interface accepts input via a stylus to enable changes to the editable text portion on an individual character (i.e., a character-by-character) basis. The correction interface further may include or associate with a "suggestion list" portion that includes at least one alternative to substitute into the editable text (e.g., akin to suggestion lists provided by conventional spell checking or handwriting recognition programs) and/or a "task list" portion that displays one or more potential actions accessible and/or available through the interface. Systems and methods according to at least some aspects of this invention activate and/or otherwise use user interfaces like those described above. Additional aspects of the invention relate to computer-readable media including computer-executable instructions stored thereon: (a) for activating and/or providing user interfaces like those described above, and/or (b) for performing various methods and/or operating various systems, including systems and methods like those described above.

BRIEF DESCRIPTION OF THE DRAWINGS

The above and other objects, features, and advantages of the present invention will be more readily apparent and more fully understood from the following detailed description, taken in conjunction with the appended drawings, in which:

FIGS. 3A and 3B illustrate input of electronic ink data and its availability as machine-generated text in an example correction portion provided in some examples of the present invention;

FIGS. 4A through 4G illustrate various example editing operations available in a correction portion provided in systems and methods according to some examples of the present invention;

FIG. 5 illustrates an example of additional features available in a correction portion provided in some examples of systems and methods according to the present invention;

When the same reference number is used in more than one of the attached drawings, it is intended to refer to the same or similar parts, features, or steps in the various different drawings.

DETAILED DESCRIPTION

Figure 1:
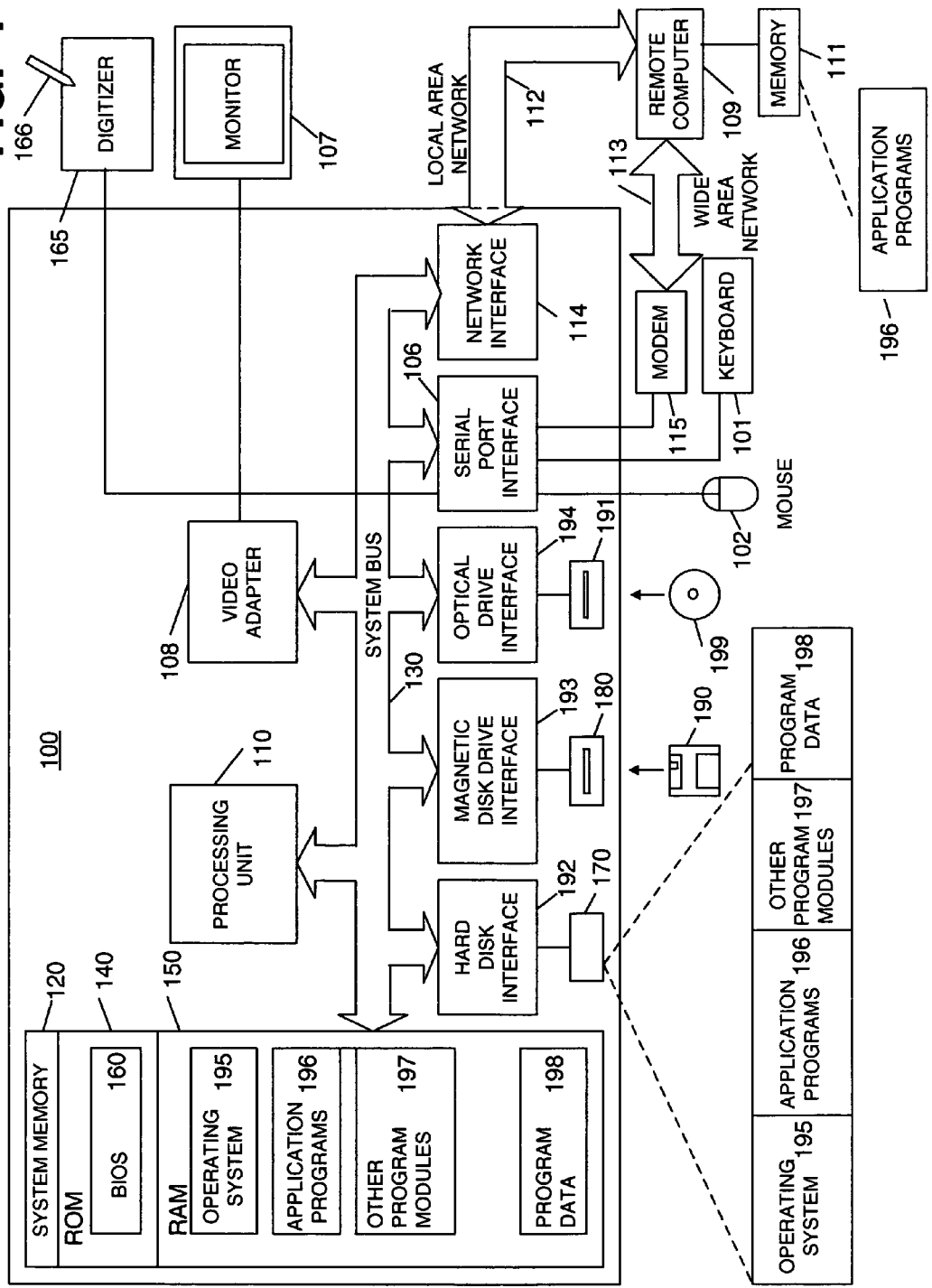
FIG. 1 illustrates a schematic diagram of a general-purpose digital computing environment in which certain aspects of the present invention may be implemented.

As described above, aspects of the present invention relate to user interfaces, systems, methods, and computer-readable media for processing electronic data and interacting with electronic text in pen-based computing systems. The following description is divided into sub-sections to assist the reader. The sub-sections include: Terms; General Description of Various Aspects of the Invention; Example Hardware; Example User Interfaces, Systems, Methods, and Computer-Readable Media According to the Invention; and Conclusion.

I. Terms

The following terms are used in this specification and, unless otherwise specified or clear from the context, the terms have the meanings provided below:

"Pen"—Any type of user input device useful in entering electronic ink into and/or otherwise manipulating or controlling an electronic document and/or a computer operating system. The terms "pen" and "stylus" are used interchangeably in this specification.

"Pen-Down Event"—An event that is initiated at the time a pen contacts a digitizer. Typically, a pen-down event will end at the time the pen leaves the digitizer surface (also called a "pen-up event" in this specification).

"Hover"—Positioning or locating a pen proximate or adjacent to a digitizer surface but not in contact with the surface, irrespective of whether the pen is moving. No specific time period or cessation of motion at a particular location or position is necessary to constitute a "hover" action. For example, a "hover" may occur during the time period that a user continuously moves a pen toward and into contact with a digitizer surface.

"Render" or "Rendered" or "Rendering"—The process of determining how information (including text, graphics, and/or electronic ink) is to be displayed, whether on a screen, printed, or output in some other manner.

"Computer-Readable Medium" means any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

Aspects of the present invention relate to user interfaces, displayable by an appropriate display device, that may be used for editing electronic text and/or otherwise interacting with electronic text using pen input in pen-based computing systems. Such interfaces may include: (a) a display portion that displays an original text (e.g., machine-generated text provided by a handwriting recognition engine or some other source); and (b) a correction interface that displays an editable text portion corresponding to at least a portion of the original text, wherein the correction interface accepts input via a pen to enable changes to text in the editable text portion on an individual character basis. In some examples, user interfaces according to at least some aspects of the invention further may include a "suggestion list" portion that includes at least one alternative, selectable using the pen, to substitute into the editable text portion (e.g., akin to suggestion lists provided by conventional spell checking, handwriting recognition, or speech recognition programs). Still other examples of user interfaces according to the invention may include an "action item" or "task list" portion, e.g., a portion including a menu having at least one action item or task that is selectable using the pen. In at least some examples of the invention, the suggestion list portion and/or the task list portion may be included as part of the correction interface, they may be attached to or otherwise associated with the correction interface, and/or they may otherwise appear at appropriate times or places whenever the correction interface is displayed, available, or accessible.

In at least some examples of the invention, the correction interface, optionally along with the suggestion list portion and/or the task list portion, will appear automatically, e.g., as a "pop-up" panel or portion, when at least some portion of the original text is selected, and these elements of the interface may appear at any desired or suitable location on the display without departing from the invention (e.g., proximate to the selected portion of the text appearing on the display). Additionally or alternatively, the correction interface (and/or any other associated interface portions) may appear when activated by the user (e.g., by activating a menu item).

The electronic or machine-generated text editable through the correction interfaces provided in accordance with at least some aspects of the invention may be obtained from any suitable source. For example, at least some of the text may be machine-generated text provided by a handwriting recognition engine that recognized handwritten electronic ink input written by a user on a pen-based computing system, such as a tablet PC. Additionally, the machine-generated text to be edited may be input via a keyboard (hard or soft), via speech recognition, downloaded from an external source, and/or via other input devices or mechanisms without departing from the invention. Also, the machine-generated text to be edited may be located in or available through any suitable or desired application program without departing from the invention, such as in a word processing application program, a spreadsheet, a web browser, a web page, an email program, a document management program, or any other desired program or other source without departing from the invention.

As noted above, user interfaces according to at least some examples of this invention may allow the correction interface or portion to accept input via the electronic pen that changes the editable text portion in the correction interface on an individual character basis. Various ways of editing text in the editable text portion of a correction interface may be available in user interfaces according to the invention. For example, at least some input to the correction interface may insert at least one additional character between two existing, consecutive characters present in the editable text portion. As another example, at least some input to the correction interface may delete an existing character from the editable text portion. As still another example, at least some input to the correction interface may change one or more existing characters in the editable text portion. These changes in the editable text portion further may trigger corresponding changes in the original text displayed in the display portion, in at least some examples of the invention.

Additional aspects of the invention relate to systems and methods for providing and/or using user interfaces for editing or modifying machine-generated text, like the user interfaces generally described above. Such systems and methods for calling and/or activating user interfaces like those described above may include, for example: (a) receiving input requesting a correction interface (via any suitable or available input device or element); and (b) activating the correction interface in response to the input. Example systems and methods for using such user interfaces may include, for example: (a) receiving input (e.g., via any type of input element or device) selecting at least a portion of an original text (e.g., electronic ink text, machine-generated text, or other information on the computer); and (b) activating a correction interface in response to this input. In at least some examples of systems and methods according to the invention, the correction interface may have structures and functions like those described above.

Aspects of the invention also relate to computer-readable media including computer-executable instructions stored thereon for providing and activating user interfaces, like those described above, as well as for performing various methods and/or operating various systems using such interfaces, including systems and methods like those described above.

III. Example Hardware

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art.

Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
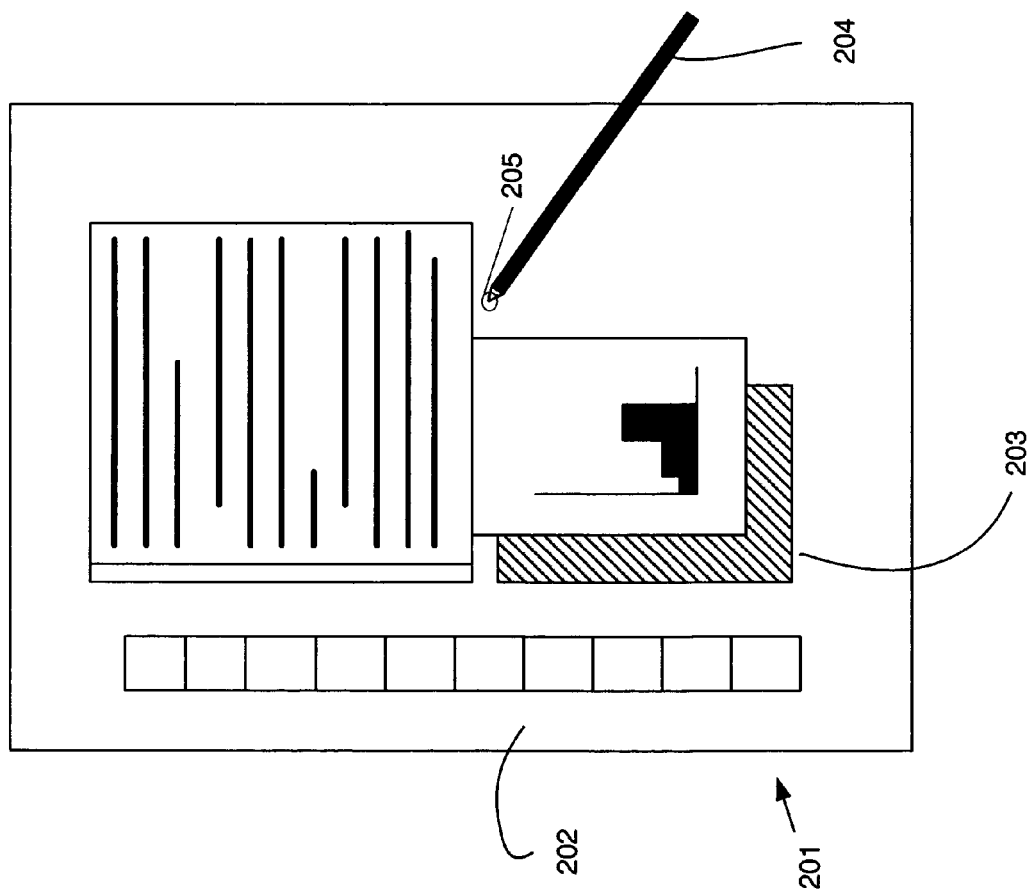
FIG. 2 illustrates a pen-based personal computing (PC) environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area and thereby enter electronic ink data into the system. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, also may be used. The pen-based computing system 201 interprets gestures made using stylus 204 in order to manipulate data, enter text as electronic ink, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen," in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used as an input device, e.g., for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an operating system and/or an application program can use to capture, manipulate, and store ink and/or other pen actions or events. The ink platform also may include a mark-up language including a language like the extensible markup language (XML). Additional examples of the ink platform may use the DCOM (distributed component object model) implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or that accept, process, or display electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus or that can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

IV. Example User Interfaces, Systems, Methods, and Computer-Readable Media According to the Invention As described above, aspects of the present invention relate generally to user interfaces, systems, and methods for interacting with and processing electronic text using pen-based computing systems and other computing systems using a pen as an input device. In conventional computer systems that include a mouse (or some other pointing device) and/or a keyboard, editing machine-generated text is relatively easy and quick, and such systems and methods are very familiar to users. With the growing popularity of pen-based computing systems, however, these conventional hardware based editing tools are not always available to or preferred by users, particularly for users that input all data and fully control the computer's user interface and operating system using only a pen. While in some instances a user can call up and use a soft keyboard and the pen to edit text, doing so can be slow, cumbersome, and frustrating, particularly when a large amount of text must be reviewed and edited.

FIG. 3A illustrates example handwritten user input in a pen-based computing system. In this example, the user has written the word "confection" on the digitizer screen 300 of the pen-based computing system using the pen, and the computer has stored this information as electronic ink in a conventional manner known and understood by those skilled in the art. The electronic ink data can be collected in any suitable manner and stored in any suitable format without departing from the invention, including the use of conventional manners and formats as are known in the art, such as the ink serialized format ("ISF").

At any appropriate time while or after the electronic ink data is collected, systems and methods according to at least some examples of the invention will send this data to a handwriting recognition engine, as is known in the art, which will attempt to recognize the text corresponding to the handwritten input data. Any desired handwriting recognizer, such as one or more of the handwriting recognizers provided with the Windows XP Tablet PC Edition™ operating system (available from Microsoft Corporation of Redmond, Wash.) or other known or conventional handwriting recognizers, may be used with systems and methods according to the invention. Systems and methods according to at least some examples of the invention can automatically send the data to the handwriting recognition engine, optionally, as it is being collected, after the user has stopped inputting ink for a predetermined time period, and/or at any other suitable or desired time or interval. As another alternative, in at least some instances, the user could take appropriate action that sends the data to the handwriting recognition engine, for example, by tapping on an icon and/or a menu item using the pen, optionally after selecting some or all of the available handwritten input. Handwriting recognition may be used to convert the handwritten electronic ink text to machine-generated text, e.g., text more readily usable by conventional computer operating systems and in conventional application programs, such as word processing programs, spreadsheets, web browsers, email programs, instant messaging programs, and the like.

Handwriting recognition software, however, does not always produce machine-generated text that correctly corresponds to the original handwritten ink input, either because of recognizer errors, illegible handwriting, shortcomings in the recognizer's dictionary, and the like. In such instances, a user may desire to correct the machine-generated text produced by the handwriting recognizer to correctly reflect the original writer's intent. Also, in some instances, even when the handwriting recognition software has correctly recognized the original handwritten text, a user may desire to modify or edit the text using a pen on a pen-based computing system. Aspects of the present invention also allow users to freely edit machine-generated text from any source, on a character-by-character basis, using a pen and a pen-based computing system.

Accordingly, for various reasons, a user may desire to change or edit machine-generated text present in an application program running on a pen-based computing system. This may be accomplished, in at least some examples of this invention, by selecting one or more words to be edited or modified and calling up or requesting a "correction portion" or other correction interface that enables the machine-generated text corresponding to the selected word or words to be edited or modified on an individual or character-by-character basis. Returning to the example of FIG. 3A, assume that this handwritten text was sent to conventional handwriting recognition software that attempted to recognize the handwritten word "confection," but it incorrectly recognized it as the word "correction." When the user selects the machine-generated text "correction" (or optionally when the original ink text is selected), a correction interface, such as the example correction portion 310 shown in FIG. 3B, may appear.

The correction portion 310 according to this example of the invention includes the word "correction" spelled out (the machine-generated text is obtained from the handwriting recognition software), with each character of the word provided in separate character slots 312. Spaces 314 are maintained between adjacent characters, and in this example, a blank leading end slot 316 and a blank trailing end slot 318 also are provided. Scroll arrows 320 allow the user to move forward and backward from character to character and/or from word to word within the machine-generated text being edited or modified, as will be described in more detail below. Movement using the scroll bars 320 may take place on a character-by-character basis, on a word-by-word basis, and/or in any other suitable or desired manner.

Figure 4E:
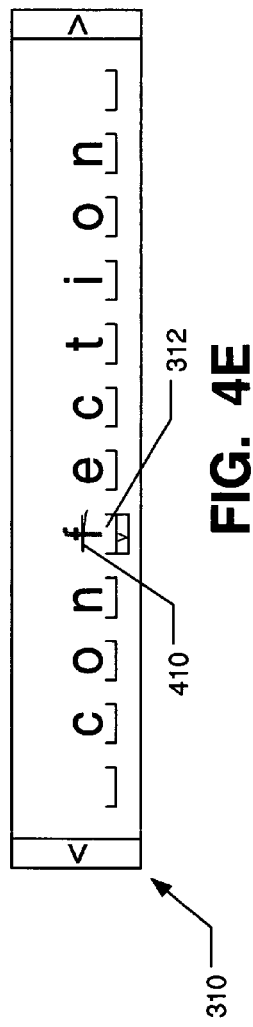

FIGS. 4A through 4G illustrate examples of potential modification, correction, or editing actions that may be available and used in conjunction with various correction interfaces, including, for example, the correction portion 310 illustrated in FIG. 3B. As shown in FIG. 4A, the word "correction" appears spelled out, character-by-character, in the correction portion 310. In the example of FIG. 4A, however, the user has selected the second "r" character in the word. While the indication of this selection action can take on any suitable form (or no indication may be given, if desired), in the illustrated example, selection is indicated by a color change in the selected character (e.g., a slightly grayed character in the illustrated example, a bolder character, etc.), and the display includes an indicator 402 that a drop-down menu is available with respect to this selected character.

Selection can take place in any suitable or desired manner or as the result of any suitable or desired action without departing from the invention. For example, in some examples of user interfaces, systems, and methods according to the invention, touching the pen on the digitizer or display screen (a "pen-down event") will result in selection of the specific character at the location of the contact (if any) (e.g., if the pen contacts the digitizer screen within the "bounding box" occupied by a character or character slot 312 in the correction portion 310, this action may result in selection of that character). In other examples of systems and methods according to the invention, a pen may be detectable by a digitizer while hovering near or adjacent to the digitizer's surface. In at least some examples of the invention, a hover event (and the resulting selection of the corresponding character or character slot 312 at the hover location) may be detected and take place during the time that a user moves the pen toward the surface of the digitizer to interact with the correction portion 310 in some manner.

Detection of a pen hover event may be accomplished in any suitable manner without departing from the invention, including in conventional manners known to those skilled in the art. For example, some pens used with pen-based computing systems are "active," which in this specification means that they transmit, reflect, alter, or otherwise modify energy, data, or other information transmitted by and/or detectable by a digitizer when the pen is located near the digitizer surface. As examples, a pen may include circuitry or other structures that receive energy emitted by the digitizer and/or alter magnetic or electronic fields transmitted by and/or sensed by the digitizer, such that the presence of the pen near the digitizer surface can be sensed by the digitizer due to changes in detected magnetic or electric fields. As another example, a pen may transmit or reflect data, electrical or magnetic fields, or other energy or information that is detectable by the digitizer, at least when located near the digitizer surface. Any suitable or desired way of sensing or detecting the presence of a pen when it is located near a digitizer surface may be used without departing from this invention.

Although a pen and digitizer combination may be designed to allow detection of a pen at virtually any reasonable position with respect to the digitizer surface, in at least some conventional pen-based computing systems with active pens, the pen is initially detectable when it is about one-half to two inches from the digitizer surface, and in some examples, when it is approximately a half inch to an inch from the digitizer surface. In such systems, if desired, selection of a character or character slot (or word, as will be described in more detail below) may result when the pen hovers above the surface of the digitizer or display screen at the correction interface, and the character or character slot (or word) immediately beneath or adjacent the tip of the pen during the hover action will be the character or character slot (or word) selected (e.g., if the hover action occurs over a bounding box of a character or character slot (or word), that character or character slot (or word) will be selected).

Changes to the machine-generated text may be made in various ways using the example correction portion 310 illustrated in FIG. 4A. For example, as shown in FIG. 4B, a user can change characters in the machine-generated text using the pen by simply writing the desired new character (the letter "f" in this illustrated example) in electronic ink over or near the original character or character slot 312 (the second letter "r" in this example). This new electronic ink character then will be sent to the handwriting recognition engine, and a new machine-generated character corresponding to the newly handwritten character will replace the original machine-generated character. Optionally, if desired, the machine-generated text and/or the original ink associated with one or more characters or words to the left and/or right of the newly written character also may be sent to the recognizer, e.g., to provide more context for the newly written character and to aid in more accurate recognition (by enabling better use of a dictionary associated with the recognizer). In at least some examples of the invention and/or in at least some instances, the handwriting recognition software will be aware of the original character present in the character slot 312 (the original letter "r"), and it will avoid selecting this original character when the new machine-generated character is determined (i.e., it will not replace the original letter "r" with a new letter "r" on the assumption that the user would not have made a change if the original character was correct). However, if the systems and methods should determine that the user is rewriting an entire word or portion thereof (e.g., by noting ink input associated with plural consecutive characters in a relatively rapid manner), they may not apply the above-mentioned character recognition restriction, on the assumption that the user is rewriting the entire word or a portion thereof (some users will quickly rewrite an entire word or a portion thereof on the correction portion 310, including previously correctly recognized characters, particularly when several characters in the correction portion 310 need to be changed).

Although FIG. 4B shows the actual electronic ink for the correction or change appearing in the correction portion 310, this is not a requirement. Rather, the digitizer could simply collect the input and send it to a recognizer without actually rendering the electronic ink in the character slot 312. As another alternative, the ink could be rendered in the character slot 312 for a predetermined time period and/or until it is replaced by the newly recognized machine-generated character provided by the recognizer.

Accordingly, with the change made as shown in FIG. 4B, the machine-generated text of this example now will comprise the character string "corfection," as shown in FIG. 4C. As the present modifications continue, as illustrated in FIG. 4C, the user has now selected the first "r" character for further change, for example, through a pen-down event or hover selection action as described above. Again, the selection is shown by a color change in this character and by the appearance of the drop-down menu indicator 402 associated with this character slot 312. In this example, the user has decided to further edit the text using the options available from the example drop-down menu, so he/she touches on the drop-down menu indicator 402 using the pen, which causes the entire menu 404 to appear. Of course, the drop-down menu 404 may be activated in any desired manner or as the result of any desired action without departing from this invention.

The drop-down menu 404 in this example contains a listing of various alternative character selections that the user may select to substitute into the machine-generated text for the originally recognized character. The user can select a specific character (or a character string, if available) from the menu 404 (e.g., by touching the pen on the desired alternative or in some other suitable manner), and machine-generated text corresponding to this selected alternative will replace the original machine-generated text. In the example illustrated in FIG. 4C, the alternative character "n" is selected by the user by tapping the pen on the letter "n" in menu 404 (as indicated by cross hatching in FIG. 4C), which ultimately produces the word "confection," as illustrated in FIG. 4D.

As illustrated in FIG. 4C, the drop-down menu 404 need not contain only other alternate characters. Rather, the drop-down menu 404 may include punctuation and/or other typographical symbols without departing from the invention. Additionally, as one common alternative, the drop-down menu 404 may include the same character as that originally present in the correction portion 310, but with the reverse capitalization from the original machine-generated character (i.e., the letter "R" in this illustrated example) and/or with descriptive text to clarify the machine-generated text content (e.g., to distinguish a capital "O" from a "0—zero," etc.). Additionally, the drop-down menu 404 also may allow the user to take various actions with respect to the selected character, such as deleting the character, rewriting the character using electronic ink (optionally by calling up an inking interface), inserting a space before or after the character, etc. Any suitable or desired characters, symbols, or actions can be made available through the drop-down menu 404 without departing from the invention.

Also, the characters, symbols, actions, and the like present in the listing of drop-down menu 404 can be obtained from any suitable source without departing from the invention. For example, the drop-down menu 404 could provide a list of characters or symbols obtained from the handwriting recognition engine when the character was originally recognized. As another example, a predetermined list of possible alternatives could be generated and made available to the user whenever a given machine-generated character is provided by the recognizer (e.g., whenever a small letter "l" is recognized by the recognizer, the possible alternatives provided in the drop down menu 404 may always include a capital "I" and an exclamation point ("!") and vice versa). As still another example, a list of all potential alternatives could be provided or made available for each character whenever the drop down menu 404 is activated.

Figure 4F:
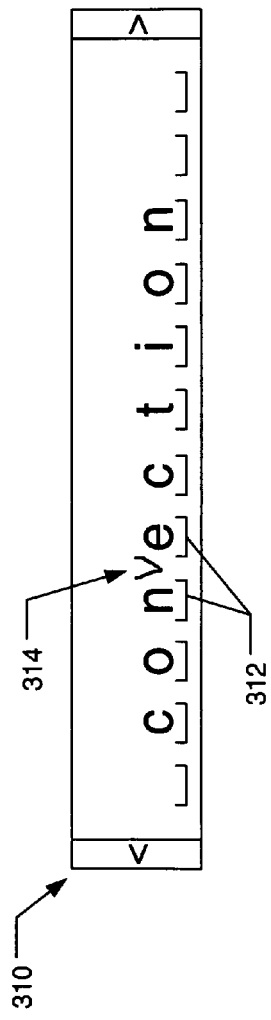

FIG. 4E illustrates an additional procedure for editing text in a correction portion 310 in accordance with at least some examples of this invention. In this illustrated example, the user has selected the letter "f" (e.g., by a pen-down event or hover action) and then written a delete gesture 410 in electronic ink over the selected character (e.g., a "cross-out" or "scratch-out" gesture in this example). This action, in at least this example of the invention, deletes the character and its associated space (resulting in the machine-generated character string "correction," as illustrated in FIG. 4F). Alternatively, if desired in some systems and methods according to the invention, the delete gesture may delete the character only, leaving a blank space associated with the character slot 312.

In at least some examples of the invention, deletion of the leading space 316 and/or the trailing space 318 may be treated specially. Specifically, if desired, deletion of the leading space 316 or the trailing space 318 may be used to combine the two words separated by the deleted space into a single word.

The delete gesture may be a scratch out, as illustrated in FIG. 4E, or any other type of gesture without departing from the invention. Of course, other gestures may be used to perform any suitable or desired functions without departing from the invention, including gestures corresponding to standard editorial functions known in the art. For example, gestures could be used to change characters from lower case text to upper case text and vice versa. As another example, gestures could be used to change or transpose the order of two consecutive characters. As still another example, an up arrow or caret located just below the line of the character slots 312 and between two character slots 312 may be used as a gesture to indicate the insertion of a blank space (the blank space later may be filled, if necessary or desired, with any desired character). Other gestures also are possible. In at least some examples of the invention, a user may designate and/or create certain gestures to correspond to certain functions, actions, characters, or symbols, in order to personalize the interface to the user's specific editing style.

Figure 4G:
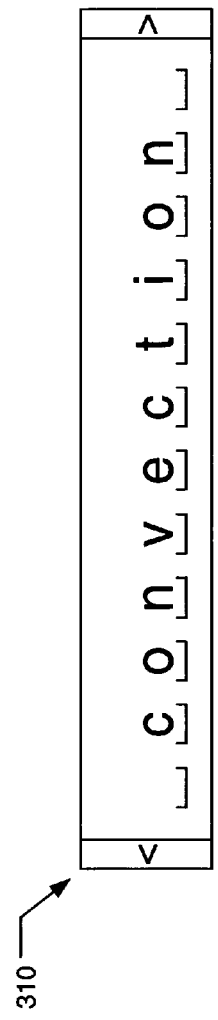

FIG. 4F illustrates still another example way of editing text, on an individual character basis, using the correction portion 310 of this example of the invention. In this example, the user inserts a new character between two existing, adjacent characters by simply writing the desired character using the pen in the space 314 between the adjacent character slots 312. In the specifically illustrated example, the user has written the letter "v" in electronic ink in the space 314 between the character slot 312 containing the first letter "n" and the character slot 312 containing the letter "e." Once written, the new ink is sent to a handwriting recognition engine, a new character slot 312 is added to the character string in the correction portion 310, and the newly recognized machine-generated character is included in the corresponding machine-generated text. In the present example, the resulting term would comprise the word "convection," as illustrated in FIG. 4G. As noted above, it is not required that the electronic ink actually be rendered, although systems and methods according to examples of the invention may do so, if desired.

In at least some examples of systems and methods according to the invention, users may write more than one character between two adjacent characters in the correction interface (e.g., in the space 314 between adjacent character slots 312), and this action may be interpreted by the systems and methods as an insertion action in which all of the new characters are inserted in the word at that location. In some examples, multiple characters may be inserted only when the entire writing action takes place between two existing characters on the correction interface. In other examples, any multi-character writing may be treated as an insertion at the location of or in the space corresponding to the first written character (e.g., even if some of the insertion writing leaves the space 314 and overlaps a character slot 312). Any other suitable or desired ways of processing a multiple character insertion may be used without departing from the invention.

Of course, the example correction interfaces illustrated and described in conjunction with FIGS. 3A through 4G above provide examples of functions and actions available in at least some examples of correction interfaces according to the invention. Those skilled in the art will recognize that not all of these described functions or actions are required in all user interfaces, systems and methods according to the invention, and not all of the described functions or actions need to be available at all times and/or in all situations. Rather, any suitable or desired correction functions and/or actions and/or combinations thereof, including those specifically described above and/or additional functions, actions, and/or combinations thereof, may be available through correction interfaces without departing from the invention.

In the example of FIGS. 3A through 4G, the selected word being edited fully fit within the allotted space of the correction portion 310. This may not always be true. For example, FIG. 5 illustrates an example of a correction portion 310 in which the word "antidisestablishmentarianism" has been selected. In this instance, the entire word does not fit without the correction portion 310, so a portion thereof is displayed (the character string "blishmentari" in the illustration). Optionally, when a long word of this type is selected, the correction portion 310 initially may display a leading blank character slot 316, and the first characters of the selected word (or the first word of a multiple word selection) will be displayed until the available slots 312 in the correction portion 310 are filled. As noted above, the user can navigate, character-by-character, using the scroll buttons 320. If desired, the scroll buttons 320 (or alternatively, additional scroll buttons or other menu items) could be provided to navigate the user to the beginning and/or end of the selected word, to the beginning and/or end word(s) of the selection (if more than one word is selected), to the beginning and/or end words of the document or page, from word to word, and the like, without departing from the invention.

Figure 6A:
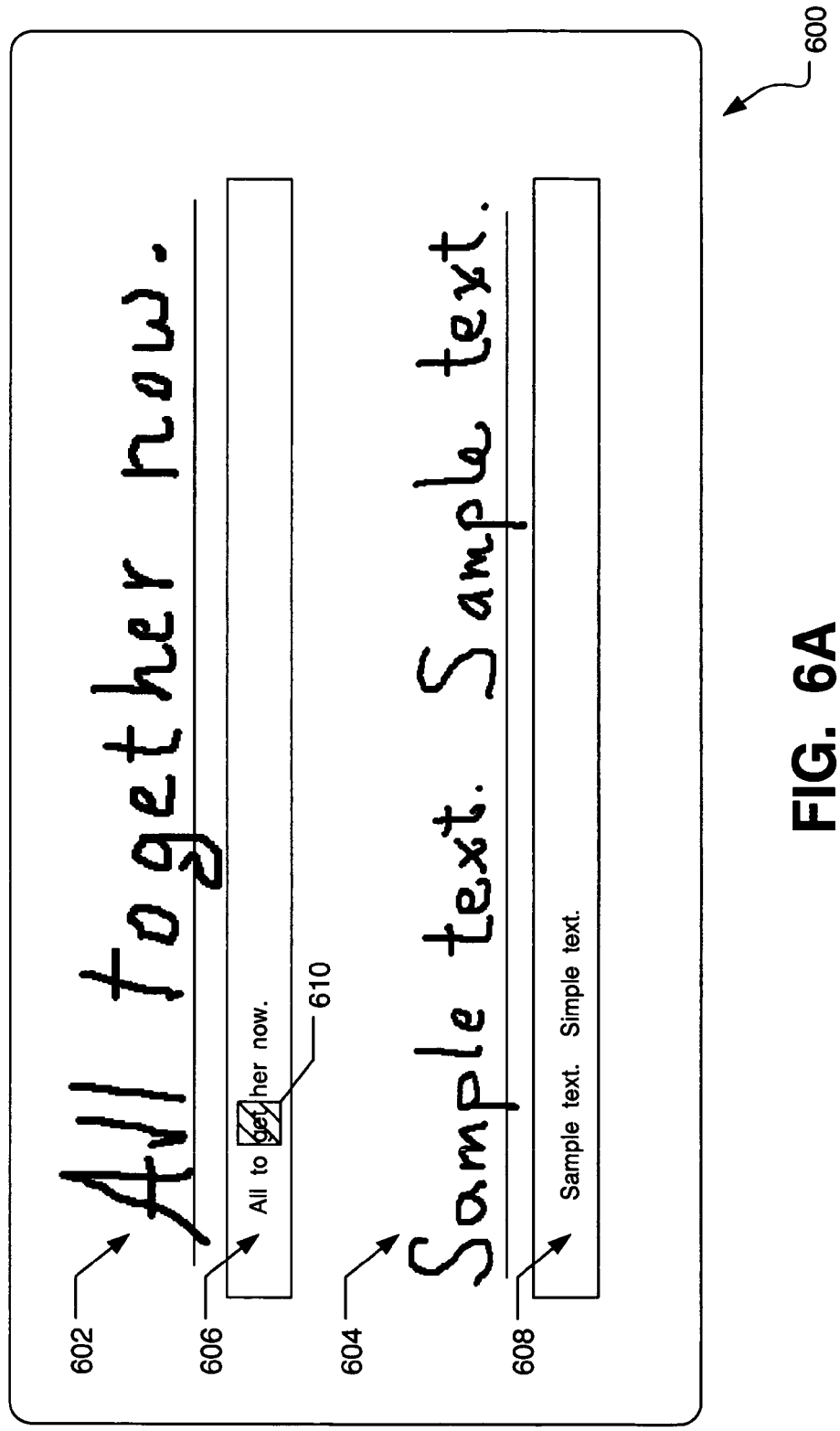
FIGS. 6A and 6B illustrate an example correction interface and various features provided in some examples of the present invention.

Correction interfaces or portions, like those described above in conjunction with FIGS. 3A through 5, may constitute one part of an overall more complete and versatile correction interface. FIG. 6A illustrates an example display screen 600 that includes electronic ink input as it might appear in some examples of pen-based computing systems having correction interfaces, systems, and methods according to additional aspects of the invention. In this example, the display 600 includes the user's electronic ink input (lines 602 and 604), and this electronic ink input has been sent to a handwriting recognition engine. The recognized results are provided as machine-generated text lines 606 and 608 located adjacent and below their corresponding ink input lines 602 and 604, respectively. In this instance, the handwriting recognition engine has made some recognition errors. Specifically, the electronic ink input line 602 ("All together now.") has been incorrectly recognized as, "All to get her now." (see line 606). Additionally, the electronic ink input line 604 ("Sample text. Sample text.") has been incorrectly recognized as, "Sample text. Simple text." (see line 608).

Because of these recognizer errors (and/or for any other desired reason), a user may decide to edit the text in this application program. In accordance with this example system and method, the user may initiate or activate a correction or editing procedure by selecting one or more words in the machine-generated text and/or in the electronic ink text. Selection may occur in any of the various manners described above, for example, by touching or tapping on the word(s) to be selected using the pen (e.g., via a touch and drag action using the pen, if more than one word is to be selected), by hovering over the word(s) to be selected using the pen (e.g., via a hover and drag action using the pen, if more than one word is to be selected), and/or in any other suitable or desired manner. In the present example, the user has selected the machine-generated text word "get" 610, as indicated in FIG. 6A by hatching.

Figure 6B:
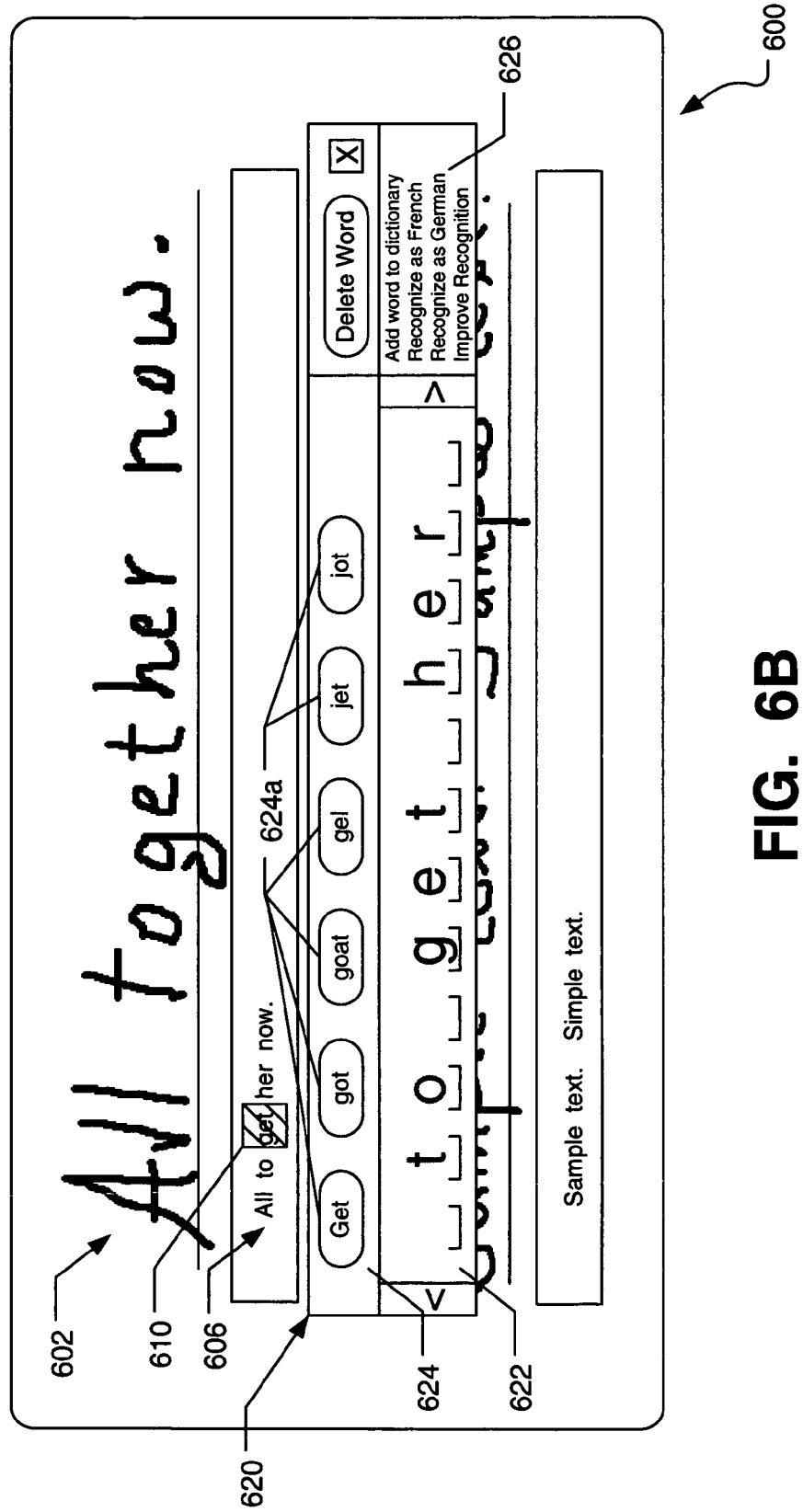

Initiation of the correction procedure in this example activates a correction interface 620, which is illustrated in FIG. 6B as a panel that overlays the display portion 600 (which continues to display the electronic ink text line 602 and the corresponding recognized, machine-generated text line 606). The correction interface 620 in at least this example is located near the originally selected machine-generated text 610. The correction interface 620 in this example includes a correction portion 622 that can support various editing operations, like those illustrated and described above in conjunction with FIGS. 3A through 5 (e.g., individual character modifications, deletions, or additions; space deletions or additions; etc.). In this illustrated example, the selected word 610 ("get" in this example) appears in the center of the correction portion 622, and it is highlighted in some manner (by bolder typeface in the illustrated example) to indicate that it is the selected word. Because the selected word 610 is relatively short in this example, the characters and words immediately surrounding the selected word 610 also appear in the correction portion 622 in a non-highlighted manner (in a lighter font typeface in the illustrated example). Notably, the machine-generated text line 606 remains visible in the display 600, and the selected word 610 remains selected. The user can navigate in a character-by-character or word-by-word manner, if desired, as described above using navigation arrows and/or in any other suitable manner. Alternatively, if desired, the selected word 610 may appear as the first word in the correction portion 622 (optionally with a leading blank space), without departing from the invention.

In addition to the correction portion 622, this example correction interface 620 includes a "suggestion list" 624, which includes various alternative words 624a returned by the recognizer that may be substituted for the word originally provided by the recognizer. In the illustrated example, the word "get" 610 has been selected, but the recognizer has provided six possible alternative words 624a in the suggestion list 624, namely, the words: "Get" (capitalized), "got," "goat," "gel," "jet," and "jot." If the suggestion list 624 contains the correct machine-generated word to be substituted for the original word returned by the recognizer, the user can select the desired word 624a from the suggestion list 624 (e.g., by tapping its icon with the pen or in any other appropriate manner), and systems and methods according to this example of the invention will delete the original recognized machine-generated text 610 and replace it with the newly selected machine-generated text 624a from the suggestion list 624. If desired, once this selection has been made, the correction interface 620 may close, and the newly selected machine-generated text 624a will appear in machine-generated text line 606.

Of course, any number of alternatives may appear in the suggestion list 624 without departing from the invention. Additionally, the suggestion list 624 may appear automatically when the correction interface 620 is activated, or it may be separate from and separately activatable from the correction interface 620 and/or the correction portion 622 without departing from the invention. For example, if desired, the entire suggestion list 624 and/or additional potential alternatives could appear on a pop-up display or other interface element that is activated by the user. Also, although the individual alternatives 624a appear as individual icons in the illustrated example, the various alternatives may appear in any suitable form or format without departing from the invention.

In at least some examples of the invention, if the user makes individual changes to characters via the correction portion 622, the suggestion list 624 and the individual alternatives 624a listed therein may be updated and changed, taking into consideration and relying on the user's changes via the correction portion 622. Also, the machine-generated text in lines 606 and/or 608 may be changed to correspond to the user made changes via the correction portion 622, optionally, as soon as the user made changes are input and recognized. Additionally, in at least some examples of the invention, one of the individual alternatives 624a may correspond to the recognizer's best determination of the characters on a character-by-character basis, even if that resulting character string is not present in the recognizer's dictionary. This feature increases the likelihood that the suggestion list 624a will contain the correct character string, especially when the original handwriting contains text that is not in the recognizer's dictionary (e.g., foreign words, acronyms, abbreviations, and the like). In still further examples of the invention, one of the available alternatives 624a may be a reverse capitalization of the original machine-generated text, at least if both capitalized and non-capitalized versions of the word appear in the recognizer's dictionary and/or if neither the capitalized nor the non-capitalized versions of the word appears in the recognizer's dictionary.

The correction interface 620 in this example of the invention also includes a "task list" section 626, which includes various potential tasks or actions that a user may take with respect to a selected word or words in the correction interface 620. For example, in the illustrated example correction interface 620, the task list 626 includes the actions: "delete word" (which deletes the selected word from the machine-generated text line 606); "add word to dictionary;" "recognize as French" (which allows the user to specify a language and an associated handwriting recognizer for an individual word or series of words contained in the selection); "recognize as German;" and "improve recognition" (which helps customize the recognizer based on a specific user's habits or writing characteristics). The user may select any desired action by touching the digitizer with the pen at the location associated with the action. Of course, any desired actions or tasks may be included as part of the task list 626 without departing from the invention, including, for example: combine or merge words, change case, and the like. Optionally, in at least some examples of the invention, any time words are corrected in the correction interface (optionally after the same correction has been made a predetermined number of times and/or after the same word or character string has been entered a predetermined number of times), the word or character string may be automatically added to the user's dictionary, if necessary. In this manner, the system can automatically adapt to the user's individual writing content, characteristics, and style, thereby improving future recognition results.

Figure 7A:
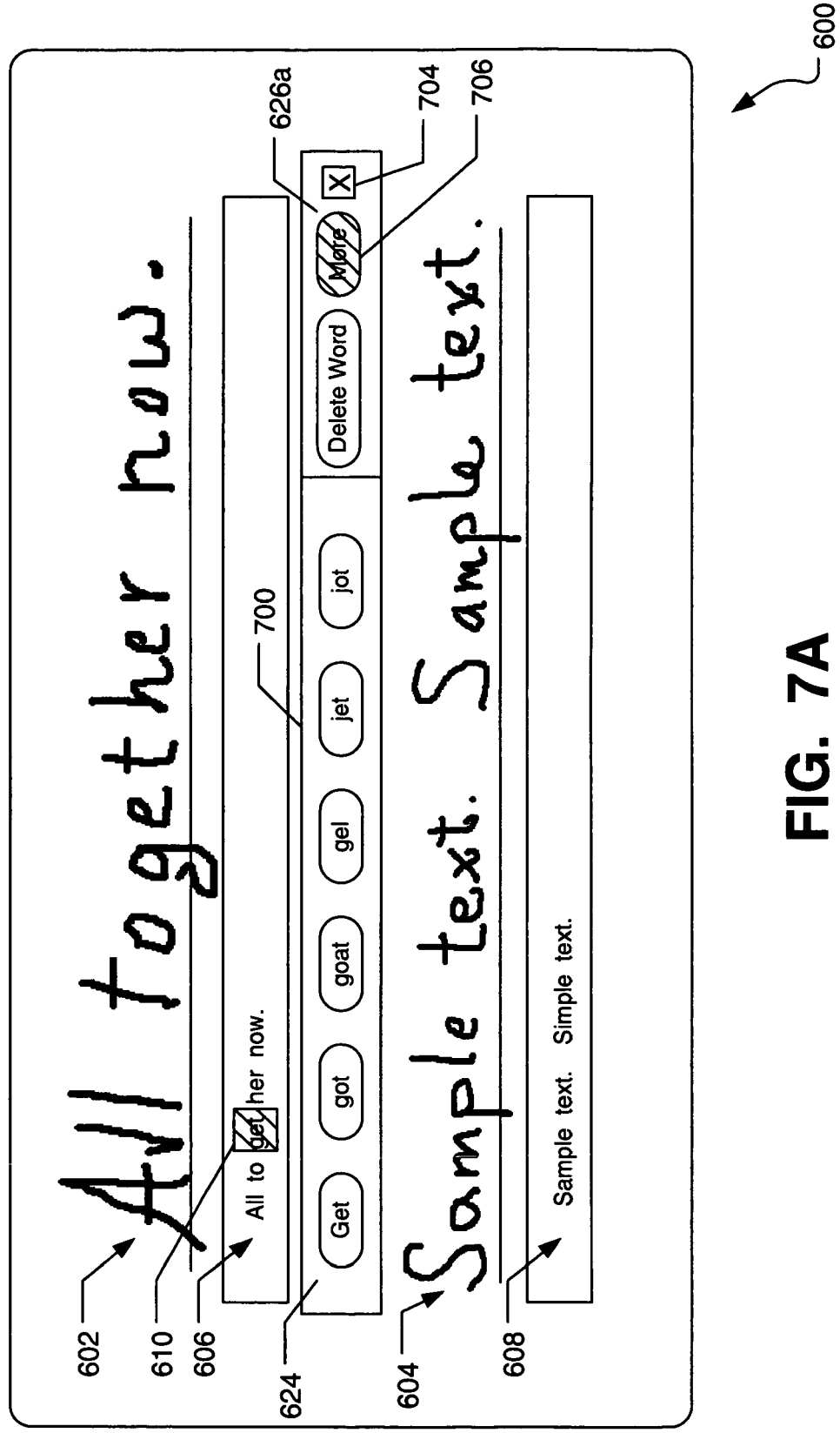
FIGS. 7A and 7B illustrate another example correction interface and various features provided in some examples of the present invention.
Figure 7B:
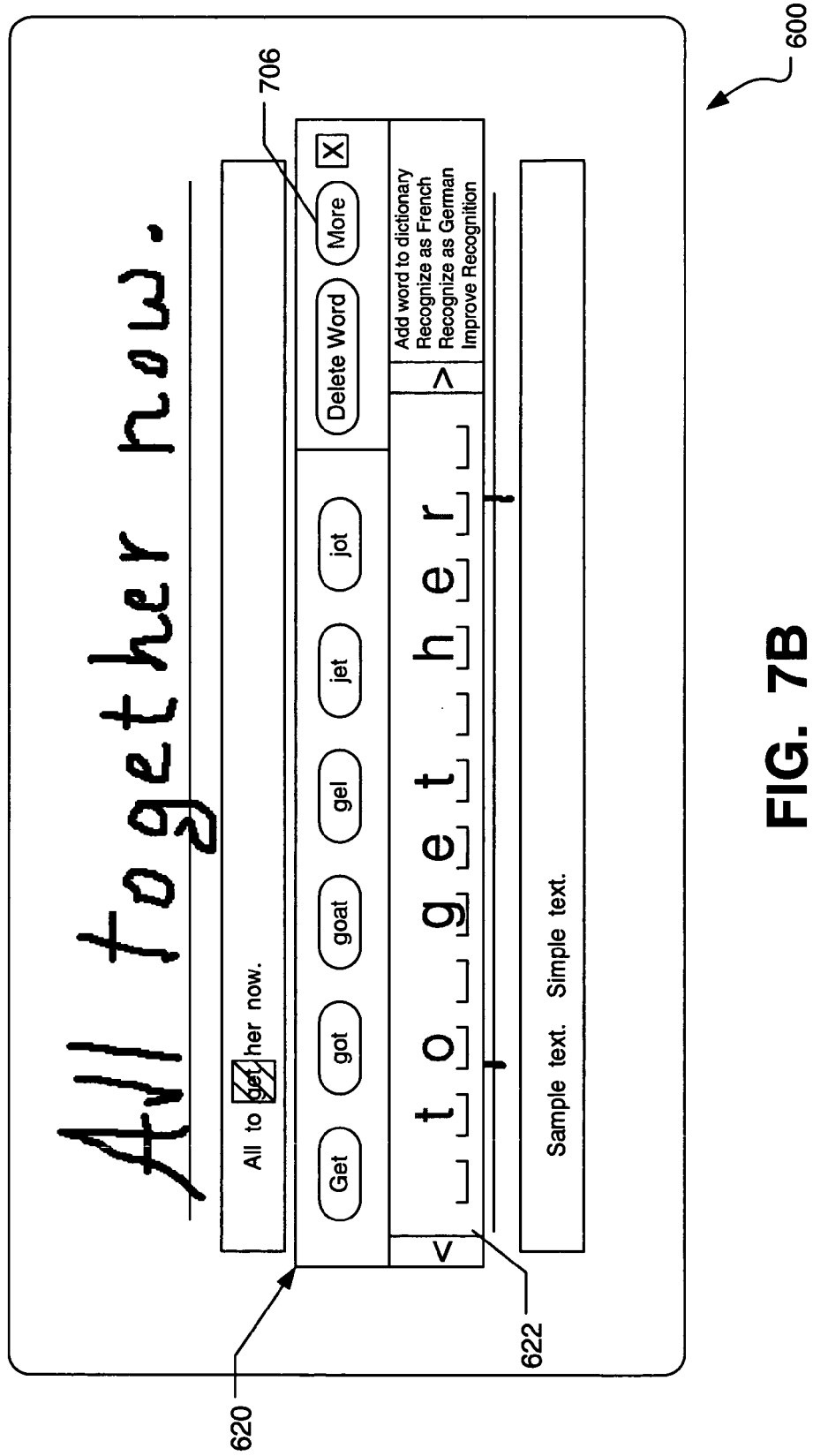

FIGS. 7A and 7B illustrate various additional features of user interfaces according to another example of the invention. In this illustrated example, the handwritten text lines 602 and 604 and the machine-generated text lines 606 and 608 appear on the display 600 as in the example of FIGS. 6A and 6B. When either machine-generated or handwritten text is selected in this example (such as the selected machine-generated word "get" 610 in the illustrated example), however, a more abbreviated correction interface 700 appears, at least initially. In the illustrated example, the abbreviated correction interface 700 includes a suggestion list 624 (e.g., like that described above in conjunction with FIG. 6B) and an abbreviated task list 626a.

If desired, in at least some examples of the invention, the abbreviated correction interface 700 may remain displayed until the user selects one of the suggested alternatives from the suggestion list 624 or from the abbreviated task list 626a, or until the user closes the interface in some appropriate manner (e.g., by tapping the pen in the "close" box 704, initiating another action, tapping outside the correction interface 700, etc.). As another alternative, the correction interface 700 may disappear after a predetermined time when no further user input is received and/or when the user moves the pen away from the display 600 (optionally, for a predetermined threshold time period).

If the initially appearing suggestion list 624 and/or the abbreviated task list 626a do not include the alternative word and/or action desired by the user, the user may activate a more complete correction interface. Activation of the more complete user interface can take place in any suitable manner without departing from the invention. For example, the interface may be activated by tapping on the "more" icon 706 provided in the abbreviated task list 626a using the pen. Selection of the "more" icon 706 is illustrated in FIG. 7A by hatching on the icon 706. Any suitable or desired correction interface, such as the correction interface 620 of FIG. 6B, may then appear, as illustrated in FIG. 7B. As another potential option or alternative, the entire correction interface 620 may automatically appear, for example, within a certain time period after activation of the abbreviated correction interface 700 if no further user input is received, without departing from the invention. Any other desired manner of activating a more complete correction interface may be provided without departing from the invention.

As another potential alternative or option, additional correction alternatives (such as a still larger or more complete correction interface) may be activated from the interface 620 of FIG. 7B, e.g., by again tapping the "more" icon 706 with the pen. Any suitable or desired tasks, programs, alternatives, or correction options may be activated and made available from the abbreviated correction interface 700, the more complete correction interface 620, and/or any further correction interface without departing from the invention.

Figure 8:
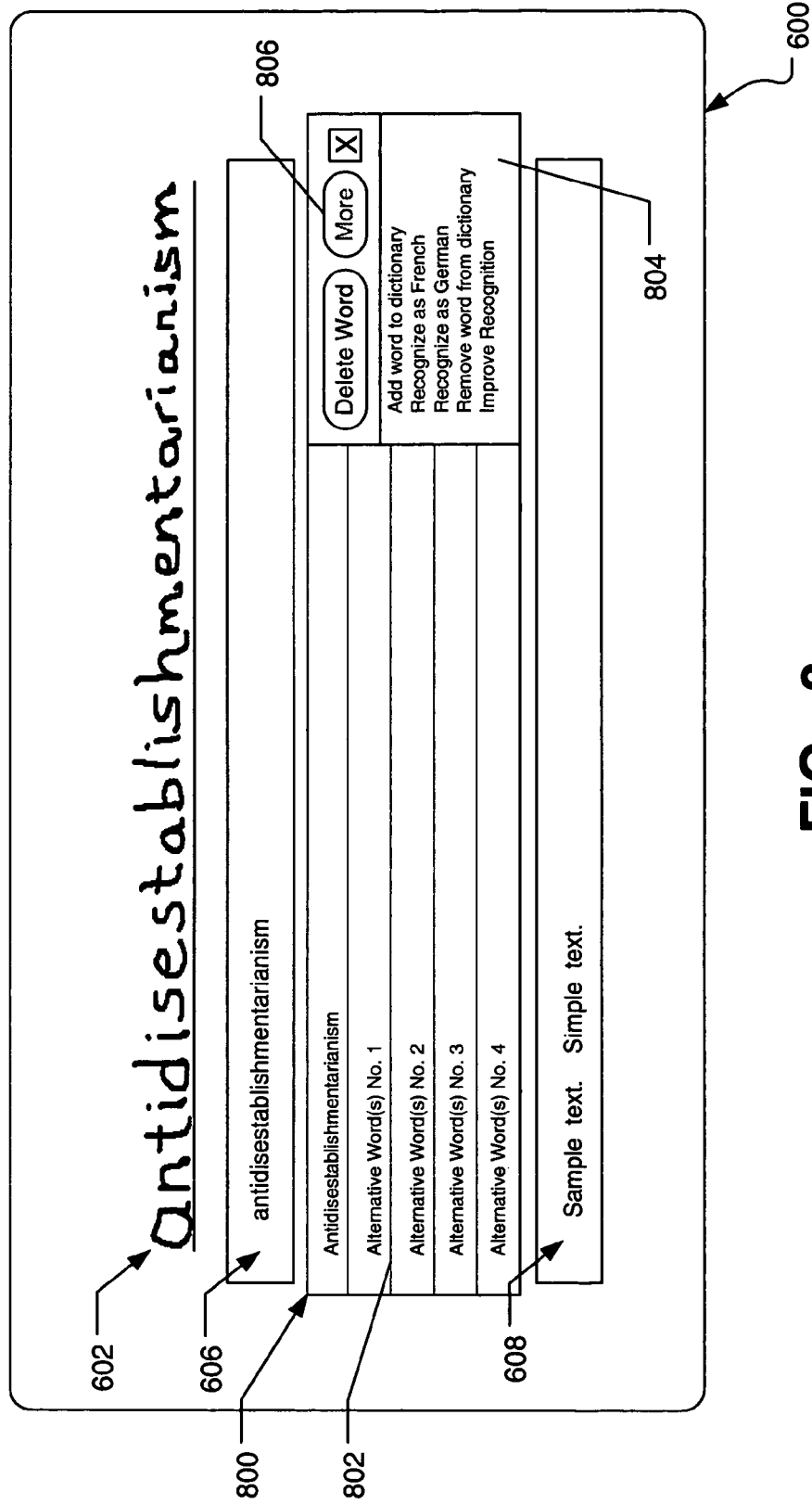
FIG. 8 illustrates still another example correction interface and various features provided in some examples of the present invention.

FIG. 8 illustrates another example correction interface 800 that may be used in at least some instances or in at least some examples of this invention. This example interface 800 is particularly useful in situations where the recognized word is so long that it does not fit within the character-by-character correction interface 622 illustrated in FIGS. 6B and 7B. Long words of this type are particularly common in some languages, such as German, Norwegian, and other Scandinavian languages. In this example, the display screen 600 displays electronic ink lines 602 and 604 and their corresponding recognized machine-generated text lines 606 and 608 as generally described above (in this illustration, the second electronic ink line 604 is completely masked by the overlaying correction interface 800), like the displays 600 illustrated in FIGS. 6A through 7B. When the correction interface 800 initially appears (e.g., when activated by user selection or in any other desired manner), a suggestion list 802 appears that includes a vertically arranged listing of different words, and a task list 804 also appears. Optionally, if desired, a character-by-character correction interface (like correction interface 310 illustrated in FIG. 5 and correction interface 622 illustrated in FIGS. 6B and 7B) may be activated from correction interface 800 in any suitable manner, e.g., by tapping the "more" icon 806 with the pen, automatically after a predetermined time period, etc. As still another alternative, an individual character correction interface also may appear automatically, if desired, when the interface 800 is activated, without departing from the invention.

Figure 9A:
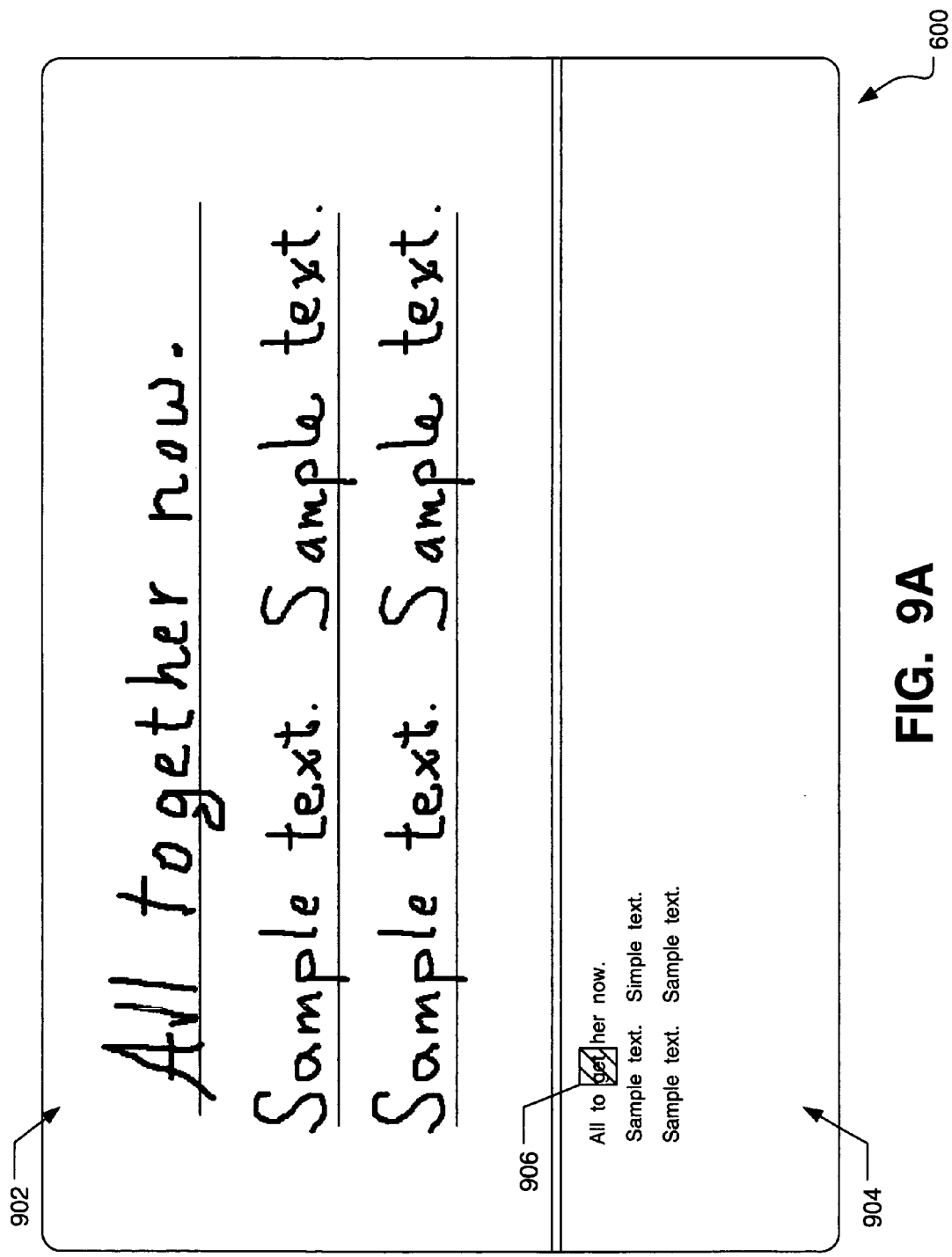
FIGS. 9A and 9B illustrate another example implementation of a correction interface according to some examples of the present invention.
Figure 9B:
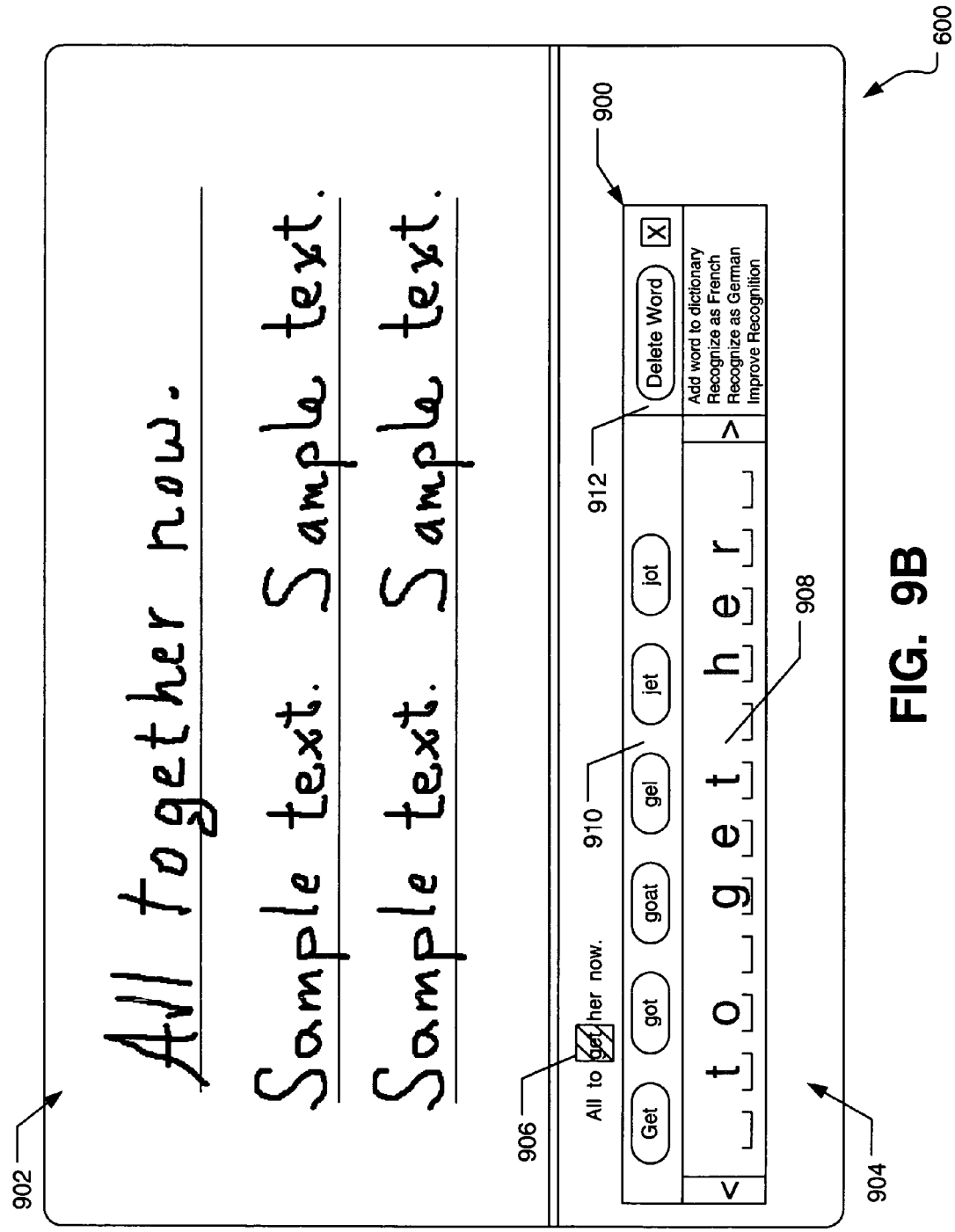

FIGS. 9A and 9B illustrate a display screen 600 displaying another example correction interface that includes features according to at least some examples and aspects of this invention. In this example, the display screen 600 includes an inking panel or portion 902 that displays and/or accepts electronic ink information and input and a machine-generated text portion or panel 904 that displays the corresponding machine-generated text produced by the recognizer. As in the examples described above in conjunction with FIGS. 6A through 8, a user can make corrections to the recognized text, e.g., by selecting an ink or machine-generated word using a pen tap or hover action. In the illustrated example of FIG. 9A, the word "get" 906 is selected, as indicated by hatching.

Selection of a word in this example system and/or method according to the invention causes a correction interface 900 to appear, as shown in FIG. 9B. While the correction interface 900 in the illustrated example has the features of the correction interface 620 illustrated and described above in conjunction with FIG. 6B (such as the character-by-character correction portion 908, the suggestion portion 910, and the task portion 912), those skilled in the art will understand that any suitable correction interface, including any suitable or desired properties, features, and actions (including the various properties, features, and actions described above), could be used without departing from the invention.

Notably, in this illustrated example, the correction interface 900 appears as an overlay on the machine-generated text panel or portion 904, adjacent to the selected word 906. Of course, the correction interface 900 may appear at any suitable or desired location on the display 600 without departing from the invention. Additionally, the correction interface 900 may be activated when a user selects one or more electronic ink words in the electronic ink panel or portion 902, and it may be located adjacent to the selected ink word(s), without departing from the invention.

Figure 10A:
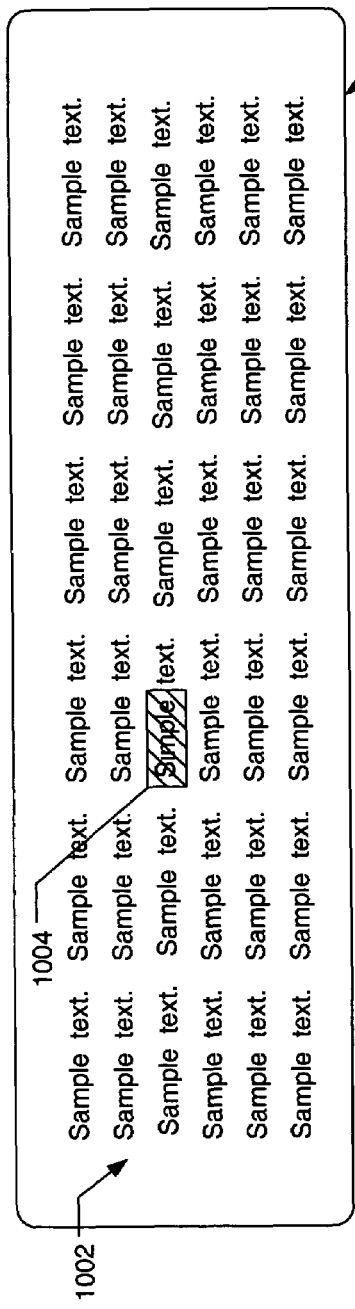
FIGS. 10A and 10B illustrate still another example implementation of a correction interface according to some examples of the present invention.
Figure 10B:
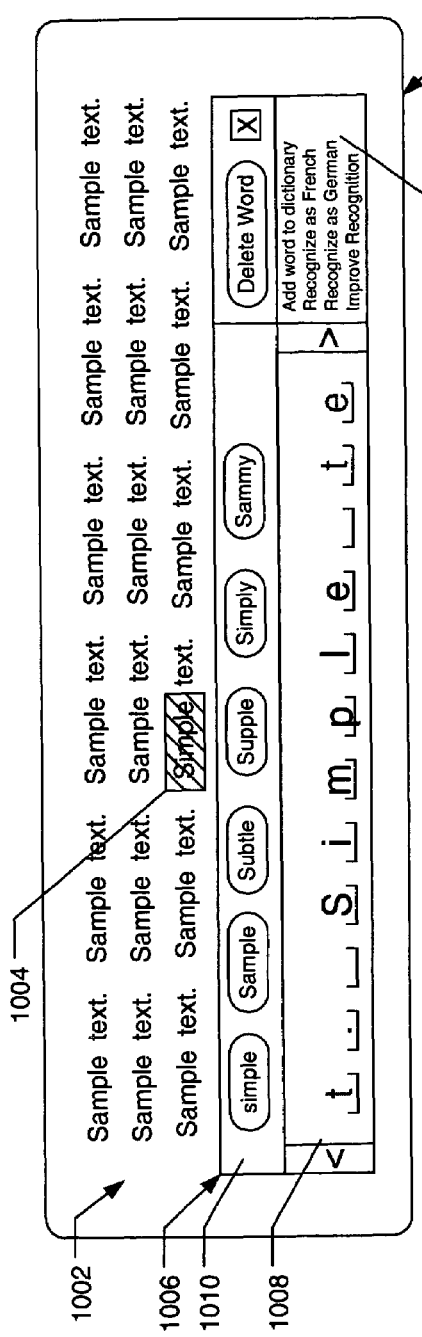

The present invention is not limited to use with electronic ink input and/or machine-generated text obtained from a handwriting recognition engine. Rather, correction interfaces according to various aspects of the invention can be useful to make changes, edits, or corrections on machine-generated text from any original source using a pen-based computing system, including, for example, machine-generated text originating from a word processing program, from a web page or web browser, from a spreadsheet, from an email management program, from a document management program, from a speech recognition program, and the like. FIGS. 10A and 10B illustrate an example of such a system and method. In this example, a file or document in a word processing program or other application program contains machine-generated text 1002 that is displayed on the display 1000 of a pen-based computing system. A user that is reviewing the text 1002 on a pen-based computing system may wish to make changes to some of the text 1002, but the user may not have access to and/or may not wish to use a hard or soft keyboard associated with the computer. Rather, they may wish to make permanent changes to the text 1002 using only the pen as an input device.

In examples of the invention like those illustrated in FIGS. 10A and 10B, a user can make changes to the machine-generated text 1002 by selecting one or more words (indicated in FIGS. 10A and 10B as hatching associated with word 1004). Selection can be achieved using a pen tap or touch on the desired word, using a tap and drag action, using a hover action, using a hover and drag action, or in any other suitable or desired manner, without departing from the invention. Selection causes a correction interface 1006 to appear, in the manner generally described above. While in the illustrated example the correction interface 1006 includes a character-by-character correction panel or portion 1008, a suggestion panel or portion 1010, and a task panel or portion 1012, much like various examples of correction interfaces described above, those skilled in the art will recognize that the interface may contain any desired or suitable properties, functions, or actions without departing from the invention.

While the specific examples of the invention described above are optimized for processing electronic ink data and machine-generated text in the form of conventional English and other Latin based words and text (e.g., read left to right and top to bottom), the invention is not limited to use on those types of languages and on that type of electronic ink data and machine-generated text. Those skilled in the art will recognize that aspects of this invention can be applied to any type of electronic ink data and/or machine-generated objects, including handwritten text or characters in any language and written or read in any direction without departing from the invention. Additionally, aspects of this invention can be applied to recognition and processing of other types of data and machine-generated objects without departing from the invention, such as data and elements in charts, diagrams, graphs, flowcharts, etc.; musical data or symbols; mathematical or scientific data or symbols; drawings; etc.

Finally, the present invention also relates to computer-readable media including computer-executable instructions stored thereon for providing correction interfaces, for performing various methods, and/or for use in various systems, including the correction interfaces, systems, and/or methods described above. The computer-readable media may constitute computer-executable instructions stored on the various specific examples of computer-readable media described above.

V. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

The invention claimed is:

1. A system, comprising:
an input element adapted to receive a selection of a portion of an original text; and
a processor programmed and adapted to activate a correction interface that displays an editable text portion corresponding to the portion of the original text, the correction interface accepting input to enable changes to the editable text portion on an individual character basis, wherein at least some of the input accepted by the correction interface triggers corresponding changes in the original text.

2. A system according to claim 1, wherein the processor is further programmed and adapted to receive input inserting at least one additional character between two existing, consecutive characters present in the editable text portion.

3. A system according to claim 2, wherein the processor receives the input corresponding to the at least one additional character when the at least one additional character is written on a region of a digitizer corresponding to the correction interface between the two existing, consecutive characters.

4. The system according to claim 1, wherein the input is received via a stylus or a user's finger.

5. A system, comprising:
an input element adapted to receive a selection of a portion of an original text; and
a processor programmed and adapted to activate a correction interface that displays an editable text portion corresponding to the portion of the original text, the correction interface accepting input to enable changes to the editable text portion on an individual character basis, wherein the processor is further programmed and adapted to receive input deleting an existing character from the editable text portion.

6. A system according to claim 5, wherein the processor receives the input indicating the existing character to be deleted when a delete action is selected from a menu associated with the existing character to be deleted.

7. A system according to claim 5, wherein the processor receives the input indicating the existing character to be deleted when a delete gesture is written on a region of a digitizer corresponding to the correction interface at a location of the existing character to be deleted.

8. A system, comprising:
an input element adapted to receive a selection of a portion of an original text; and
a processor programmed and adapted to activate a correction interface that displays an editable text portion corresponding to the portion of the original text, the correction interface accepting input to enable changes to the editable text portion on an individual character basis, wherein the processor is further programmed and adapted to receive input indicating a change in an existing character in the editable text portion.

9. A system according to claim 8, wherein the processor receives the input indicating the existing character to be changed when a desired new character is written on a region of a digitizer corresponding to the correction interface at a location of the existing character to be changed.

10. A system, comprising:
an input element adapted to receive a selection of a portion of an original text; and
a processor programmed and adapted to activate a correction interface that displays an editable text portion corresponding to the portion of the original text, the correction interface accepting input to enable changes to the editable text portion on an individual character basis, wherein the correction interface includes: (a) a first portion including the editable text portion, (b) a second portion including at least one alternative to substitute into the portion of the original text, and (c) a third portion including a menu having at least one action item.

11. A system, comprising:
an input element adapted to receive a request for activation of a correction interface; and
a processor programmed and adapted to activate the correction interface, the correction interface displaying an editable text portion corresponding to at least a portion of an original text, wherein the correction interface accepts input to enable changes to the editable text portion on an individual character basis, wherein at least some of the input accepted by the correction interface triggers corresponding changes in the original text.

12. The system according to claim 11, wherein the input is received via a stylus or a user's finger.

13. A system, comprising:
an input element adapted to receive a request for activation of a correction interface; and a processor programmed and adapted to activate the correction interface, the correction interface displaying an editable text portion corresponding to at least a portion of an original text, wherein the correction interface accepts input to enable changes to the editable text portion on an individual character basis, wherein the correction interface includes: (a) a first portion including the editable text portion, (b) a second portion including at least one alternative to substitute into the portion of the original text, and (c) a third portion including a menu having at least one action item.

14. A method, comprising:

receiving input selecting a portion of an original text; and activating a correction interface that displays an editable text portion corresponding to the portion of the original text, the correction interface accepting input to enable changes to the editable text portion on an individual character basis, wherein at least some of the input accepted by the correction interface triggers corresponding changes in the original text.

15. A computer-readable medium including computer-executable instructions stored thereon for performing a method according to claim 14.

16. The method according to claim 14, wherein the input is received via a stylus or a user's finger.

17. A method, comprising:

receiving input selecting a portion of an original text;

activating a correction interface that displays an editable text portion corresponding to the portion of the original text, the correction interface accepting input to enable changes to the editable text portion on an individual character basis; and receiving input inserting at least one additional character between two existing, consecutive characters present in the editable text portion, wherein the input inserting the at least one additional character is received as a result of a user writing the at least one additional character on a region of a digitizer corresponding to the correction interface between the two existing, consecutive characters.

18. A method, comprising:

receiving input selecting a portion of an original text;

activating a correction interface that displays an editable text portion corresponding to the portion of the original text, the correction interface accepting input to enable changes to the editable text portion on an individual character basis; and receiving input deleting an existing character from the editable text portion, wherein the input deleting the existing character is received as a result of a user selecting a delete action from a menu associated with the existing character to be deleted or as a result of a user writing a delete gesture on a region of a digitizer corresponding to the correction interface at a location of the existing character to be deleted.

19. A method, comprising:

receiving input selecting a portion of an original text;

activating a correction interface that displays an editable text portion corresponding to the portion of the original text, the correction interface accepting input to enable changes to the editable text portion on an individual character basis; and receiving input changing an existing character in the editable text portion, wherein the input changing the existing character is received as a result of a user writing a desired new character on a region of a digitizer corresponding to the correction interface at a location of the existing character to be changed.

20. A method, comprising:

receiving input selecting a portion of an original text;

activating a correction interface that displays an editable text portion corresponding to the portion of the original text, the correction interface accepting input to enable changes to the editable text portion on an individual character basis, wherein the correction interface includes: (a) a first portion including the editable text portion, (b) a second portion including at least one alternative to substitute into the portion of the original text, and (c) a third portion including a menu having at least one action item selectable.

* * * * *